UNITED STATES PATENT OFFICE.

CARLETON ELLIS, OF MONTCLAIR, NEW JERSEY.

PRODUCT OF HYDROGENATION.

14,429. Specification of Reissued Letters Patent. Reissued Jan. 29, 1918.

No Drawing. Original application filed March 29, 1912, Serial No. 686,988. Divided and application filed February 9, 1917, Serial No. 147,554. Original No. 1,226,620, dated May 15, 1917. Application for reissue filed December 18, 1917. Serial No. 207,790.

*To all whom it may concern:*

Be it known that I, CARLETON ELLIS, a citizen of the United States, residing at Montclair, in the county of Essex and State of New Jersey, have invented certain new and useful Improvements in Products of Hydrogenation, of which the following is a specification.

The present application is a division of my allowed application 686,988 filed March 29, 1912 (now Patent 1,217,118, Feb. 20, 1917).

The subject matter of the present application constitutes the initial product of the process described and claimed in said application, namely colloidal metal catalysts in the hydrogenated product. In said prior application I have described and claimed a process in which an organic material containing unsaturated bodies is treated with hydrogen in the presence of a colloidal metal catalyst. The organic material treated therein may be fatty oils, such as cottonseed, rape, oleic acid, including the commercial forms such as red oil, elaine oil, distilled fatty acids, recovered oils of textile mills, oils containing linoleic or linolenic acids or their esters, or fish oil, castor oil, peanut oil, mustard oil, corn oil, soya oil and other fatty oils such as solid fats containing unsaturated bodies such as palm oil and various other oily and fatty materials; also various other organic materials such as waxes, including beeswax, carnauba wax, Japan wax, Montan wax and materials containing waxes such as wool grease, also resins, for example ordinary rosin, dammar, sandarac, mastic, shellac, elemi, thus, copal, Pontianak, also naphthalene, acid pitches, tars, asphaltic oils, malthas, rubber; also such volatile solvents as wood tar oils, wood turpentine, rosin spirits and hydrocarbon oils containing unsaturated ingredients such as petroleum distillates containing olefins and in fact almost any organic materials containing products capable of uniting with hydrogen in the presence of a catalyst. The colloidal catalyst employed may consist of any of the metals; nickel, iron and cobalt, in a colloidal form, although in some cases compounds of the metals mentioned such as the oxids, carbids or silicids thereof may be employed, or mixtures of such catalytic materials, and in some cases mixtures of such materials with colloidal silica.

I make no claim herein, to noble metals, such as platinum, palladium and the like, the cost of which prohibits their use for many of the hydrogenation processes. I include the metals *per se*, in the generic expression "non-noble metal catalyst" whereas the expression "colloidal non-noble metal-containing catalyst" includes also the compounds of the metals as above noted, in colloidal condition, as well as the colloidal metals *per se*.

The colloidal catalyst may be made by heating, for example in a current of hydrogen or other reducing gas, a fatty or similar material containing a decomposable metallo-organic body, such as nickel oleate, whereby such oleate is decomposed or reduced, and colloidal nickel produced. Thus, as in the parent case referred to, I can cause a current of oil, carrying the dissolved nickel oleate, or other like material, to come into contact with a counter-flowing current of hydrogen or water gas, whereby first the nickel oleate is decomposed, and the nickel catalyst set free in a colloidal state, and the oil is hardened in the presence of this catalyst. The herein described process of producing the catalyst is not claimed herein, but in my copending cases 817,041, February 6, 1914; 50,462, filed September 13, 1915; 76,957 filed February 8, 1916; 89,093 filed April 5, 1915; 133,252 filed November 24, 1916 and 171,220 filed May 26, 1917.

The hydrogenation of the organic materials may be carried out by bubbling the hydrogen through a stationary or moving mass of the liquid organic material at such temperatures as the said material is liquid, and in some instances the material may be rendered liquid by the use of organic solvents. The pressure employed in the process may be from 10 to 25 pounds above atmospheric, and the temperature may be slightly above that at which metallo-organic bodies such as the soaps of the above mentioned fatty materials with the catalytic metals would be decomposed. In the said prior application I have particularly claimed the passage of the organic material downwardly through a filled tower, in which it is brought into contact with a counter current of hydrogen or gas containing hydrogen, such as uncarbureted water gas.

In the treatment of such organic materials with hydrogen, in the presence of a colloidal metal catalyst or other colloidal catalyst as above referred to, there is produced a product consisting of the hydrogenated organic material, containing in colloidal suspension, the catalyzer employed in carrying out the process, and it is this product which forms the subject matter of the present application.

The hydrogenation process may be carried to a point at which the organic material will refuse to take up further quantities of hydrogen, this in the case of the liquid fatty oils above mentioned, producing a fully saturated hard fat, or the process may be stopped after only a small proportion of the quantity of hydrogen capable of being affected, has been so taken up, and the term "suspension" as employed herein is intended to cover mixtures of the catalyst with either such solid or liquid or semi-solid hydrogenated products, and is not intended to be restricted to those cases in which the medium is a liquid at normal atmospheric temperature.

The processes of hydrogenation as described herein, are not claimed herein, but in my copending case, 118,750, filed September 6, 1916.

The colloidal catalyst may be concentrated in the product, by separating a portion of the hydrogenated product from a mixture of another portion of the hydrogenated product and colloidal catalyst, such a material being suitable for addition to further quantities of organic material containing unsaturated products, for use in hydrogenation.

What I claim is:

1. As a new product, a suspension of a colloidal "non-noble metal" catalyst in a hydrogenated organic material.

2. Colloidal nickel suspended in hydrogenated fatty material.

3. A "colloidal non-noble metal-containing catalyst" suspended in a hydrogenated organic material, and suitable for use as a catalyst in hydrogenation processes.

4. A catalyst made by setting free nickel in an extremely finely divided state, from an easily decomposable nickel compound, in an oil vehicle.

5. Colloidal nickel in fatty oil containing unsaturated components.

6. A catalyzer made by setting free nickel from a solution of nickel oleate in an oil.

7. Metallic nickel in a non-settling state of fineness, suspended in an oil-vehicle, said nickel being highly conducive to hydrogen absorption by unsaturated components present in said vehicle.

8. Colloidal nickel carried in an organic vehicle.

9. A free colloidal catalytic metal of the nickel type in an oily vehicle containing chemically unsaturated fatty oil.

10. A free metal having an atomic weight between 56 and 59, said metal being in a colloidal state, suspended in an oil capable of uniting with hydrogen, in the presence of said free metal.

11. A free metal having an atomic weight, between 48 and 63.6, said metal being in a colloidal state, carried in an oil.

12. A metal having an atomic weight between 56 and 59, in a non-settling state of fineness, suspended in an organic vehicle, said metal being in the free state and being highly catalytically active and capable of producing by catalysis, a union between hydrogen and unsaturated components present in said organic vehicle.

13. A "colloidal non-noble metal-containing catalyst" carried in an organic vehicle.

14. Colloidal non-noble catalytic free metal in a fatty oil.

Signed at Los Angeles, Cal., this 10th day of December 1917.

CARLETON ELLIS.